United States Patent Office 3,803,101
Patented Apr. 9, 1974

3,803,101
ANIONIC POLYMERIZATION OF LACTAM
Tadao Matsuo ad Shuji Mori, Kobe, Japan, assignors to Mitsuboshi Belting Ltd., Kobe-shi, Hyogo, Japan
No Drawing. Filed June 30, 1972, Ser. No. 267,758
Claims priority, application Japan, June 30, 1971, 46/47,822
Int. Cl. C08g 20/18
U.S. Cl. 260—78 L
6 Claims

ABSTRACT OF THE DISCLOSURE

An anionic polymerization method for a lactam by anionically polymerizing an anhydrous or substantially anhydrous lactam with an anionic polymerization catalyst in the presence of triallylisocyanurate as a promoter is disclosed.

BACKGROUND OF THE INVENTION

(1) Field of the invention

The present invention relates to an anionic polymerization method for a lactam. More particularly, the present invention relates to an anionic polymerization method for a lactam by polymerizing an anhydrous or substantially anhydrous lactam having more than a five membered ring under heating using a strong-basic catalyst and triallylisocyanurate as a promoter.

(2) Description of the prior art

A polymerization method of a lactam in which the lactam is polymerized by heating it to high temperatures for a long period of time in the presence of water, a mineral acid, a fatty acid, an amine, etc. is well known. Also, an anionic polymerization method using a strong-basic material as a catalyst is well known as such a method.

It is known in the aforesaid anionic polymerization method that an organoaluminum compound such as triethylaluminum; lithium aluminum hydride; Grignard reagents; and other organomagnesium compounds are effective as the basic catalyst for the polymerization in addition to alkali metals, alkaline earth metals, and the hydroxides, hydrides, carbonates, and organic compounds of those metals.

However, in the case of using the aforesaid catalyst alone in the ring opening polymerization of a lactam, it is required to heat the reaction system to high temperatures above 200° C. for polymerizing the lactam and further it is required to heat the system to higher temperatures than above for a longer period of time to obtain a polymer having a higher polymerization degree with a higher polymerization efficiency.

On the other hand, when an appropriate promoter is used together with the aforesaid catalyst in such a polymerization of lactam, it is possible to obtain a polymer or a polyamide having a higher polymerization degree with a higher polymerization efficiency in a short period of time even at temperatures below 200° C. and thus the use of the promoter together with the above-described catalyst is quite effective for the polymerization.

As such a promoter to be used with the catalyst in the polymerization of lactam, various compounds such as acyl chlorides, acyl anhydrides, acyl imides, carbodiimides, organic isocyanates, N-acyl lamtams, S-triazines, acylaminocarboxylic acid esters, and uretonimine(uretidinedioneimine) derivatives are known. However, those known promoters tend to be changed chemically by the moisture in the air and thus they tend to lose their activity and must be handled with care. Furthermore, isocyanate compounds require various precautions in handling from the standpoint of toxicity. An acid chloride readily reacts with water or moisture to form hydrochloric acid and an organic acid, whereby the acid chloride loses its activity as promoter and in addition the acid thus formed obstructs the polymerization. Moreover, when the polymerization of a lactam is conducted using such a known promoter, a polymer having an undesirable color is frequently formed, for example, when an organic carboxylic acid anhydride is used, only a dark brown polymer is obtained.

SUMMARY OF THE INVENTION

As the result of investigations on finding a promoter having a catalytic activity which is not inferior to that of the aforedescribed known promoters and unaccompanied with the afore-described difficulties, it has been found that a triallylisocyanurate having the following formula acts as a promoter and has excellent activity in the anionic polymerization of lactam;

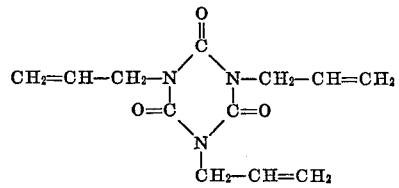

DETAILED DESCRIPTION OF THE INVENTION

Now, it is known that a triallylcyanurate which is a tautomer of the triallylisocyanurate used in this invention is barely effective as a promoter for the anionic polymerization of lactam and this is also clearly shown in Example 12 of Japanese patent publication No. 21,498/'63 concerning an anionic polymerization method for ω-lactam. On the other hand, it has been discovered that the triallylisocyanurate of the aforesaid formula which is a tautomer of the almost ineffective triallylcyanurate and is a kind of the same symmetric triazine derivative is unexpectedly effective as a promoter for the anionic polymerization of lactam. When the triallylisocyanurate is used as the promoter for the anionic polymerization of lactam, no isomerization to triallylcyanurate occurs at temperatures of 50–200° C. although it is a tautomer, and thus each isomer shows a completely different activity.

The polymerization of lactam in this invention comprises polymerizing under heating at least one anhydrous or substantially anhydrous lactam having more than a five membered ring in the presence of an anionic polymerization catalyst and the aforesaid triallylisocyanurate as a promoter. Conventionally anionic polymerizations are carried out at above 200° C. but, by the process of this invention the lactam can be polymerized very quickly at low temperatures of below 200° C.

Any materials conventionally used as anionic polymerization catalysts for lactam as described in U.S. Pat. 3,440,277 can be used as the anionic polymerization catalyst in this invention and examples of such anionic polymerization catalysts are alkali metals; alkaline earth metals; the strong-basic derivatives of those metals such as hydroxides, hydrides, and carbonates of the aforesaid metals; and organometal compounds such as alkylmetal compounds, amidometal compounds, and Grignard reagents. Typical examples of these materials include lithium, sodium, potassium, calcium, barium, lithium hydride, sodium hydride, sodium methoxide, sodium ethoxide, sodium phenoxide, naphthylsodium, sodium amide, diethylzinc triethylaluminum, sodium hydroxide, potassium hydroxide, lithium hydroxide, magnesium hydroxide, potassium hydroxide, strontium hydroxide, sodium aluminate, and the like.

The anionic catalyst used in the process of this invention can also be the reaction product of the aforesaid materials and a ω-lactam having more than a five membered ring. This reaction product catalyst is prepared by heating a lactam and the material as described above to temperatures of about 25 to 200° C. for several minutes.

The amount of each of the anionic polymerization catalyst and the promoter described above which is suitable can range from about 0.05 to 10 mole percent, preferably from about 0.1 to 3 mole percent, to the weight of the lactam to be polymerized.

In the process of this invention the anionic polymerization catalyst and the promoter can be added to the reaction system in any desired manner. Ordinarily, the polymerization of the lactam is achieved by adding an appropriate amount of the catalyst and the promoter to the molten lactam heated to about 100° C. followed by mixing well and then further heating the reaction system to a specific polymerization temperature for a specific period of time. Those operations can be conducted in a metallic mold for molding the polymer to be produced, whereby the semi-product or product of the polyamide polymer can be directly obtained.

The lactam to be polymerized in the method of this invention is a lactam having more than a five membered ring and examples of such lactams include pyrrolidone, piperidone, caprolactam, enantholactam, caprylolactam, pelargonolactam, laurolactam, decanolactam, undecanolactam, and the like. These lactams can be polymerized singly or as a mixture of two or more such lactams.

The polymerization temperature suitable for use in this invention is generally higher than the melting point of the ω-lactam monomer or the monomer mixture of two or more ω-lactam monomers and lower than the melting point of a ω-lactam polymer or a copolymer of two or more ω-lactams, that is in a range of from 25° C. to 240° C. but it is desirable that the polymerization be conducted at from 25° C. to 65° C. in case of pyrrolidone or piperidone, from 120° C. to 160° C. in case of ε-caprolactam, and from 160° C. to 180° C. in case of other ω-lactams.

The period of time for polymerization depends upon the nature of the ω-lactam to be polymerized, the nature and the amount of the catalyst, the amount of the triallylisocyanurate, the polymerization temperature, etc., but generally it ranges from a few seconds to a few hours. Ordinarily, it is generally sufficient that the period of time for polymerization ranges from a few seconds to about one hour.

The triallylisocyanurate which is a novel promoter used in this invention has various advantages in comparison with known promoters. That is, the various compounds which are known promoters tend to suffer chemical changes due to the moisture in the air to lose their activity and thus they must be handled with great care. On the other hand, the triallylisocyanurate used in this invention as the promoter are stable to not only the moisture in the air but also water as well as having extremely low toxicity to humans. Moreover, the triallylisocyanurate does not color the main polymer produced, the activity thereof is remarkably higher than those of the known promoters, and a lactam polymer can be produced quickly even at a low temperature.

As described above, the process of this invention can be used directly for producing moldings in a metallic mold as they are. For example, in contrast to the process of the present invention when a conventional basic polymerization method is employed in a pouring-type molding method, the mold must be sufficiently cooled until the molten or semi-molten moldings are solidified and can be withdrawn stably. Furthermore, the operation of the pour molding requires a long period of time, which is economically disadvantageous. However, according to the process of this invention there is, no formation of voids in the molded article caused by the shrinkage due to the low temperature of feeding and of the metallic mold and thus better moldings having no defects therein are obtained. Accordingly, by the process of this invention polyamide article of a large size can be obtained quickly and economically in a metallic mold and further the polyamide article thus produced is made of a polyamide having a high molecular weight and is quite tough.

Now, the advantages of the promoters used in the present invention will be explained in greater detail by reference to the following examples.

In the following examples, the relative viscosity of the product was measured by dissolving 0.250 g. of the polymer produced in 25.0 ml. of sulfuric acid having a concentration of higher than 97% and measuring the relative viscosity thereof at 25.0° C. using an Ostwald viscometer.

The content of the soluble components in hot water was obtained by immersing 10–20 g. of the polymer produced in hot water at 90–100° C. for several hours, drying the polymer in an oven at 105° C. and then determining the monomer and low molecular weight polymer soluble in hot water.

EXAMPLE 1

In a flask was melted 2.66 moles of ε-caprolactam at 120° C. in a dry nitrogen atmosphere and then sodium hydride (oily, 50%) was dissolved in the molten lactam in an amount of 0.2 mole percent to the lactam. The lactam-catalyst liquid was poured in a 500 ml. stainless steel beaker heated to 185° C. and then 0.2 mole percent of triallylisocyanurate was added to the liquid followed by stirring. The beaker was covered with an aluminum foil and heated in an air bath of 185° C. After 30 minutes, the molten lactam became quite viscous to such an extent that it did not flow when the vessel was tilted.

When the product was withdrawn from the vessel after 60 minutes and allowed to cool, an opaque, white and tough solid polymer was obtained. The relative viscosity of the polymer thus produced was 7.64 and the content of soluble components in hot water was 1.41% by weight.

Also, when the same procedure described as above was followed using 0.5 mole percent or 0.1 mole percent of triallylcyanurate in place of the triallylisocyanurate of this invention, the lactam did not become viscous even after 100 minutes.

EXAMPLE 2

As in Example 1, 0.2 mole percent of lithium hydride was added to 2.66 moles of ε-caprolactam melted at 130° C. and dissolved therein. Thereafter, 0.1 mole percent of triallylisocyanurate was added to the solution followed by stirring. The caprolactam was polymerized by heating the system in an air bath of 175° C. After 20 minutes, the lactam became quite viscous. Further, when the product was withdrawn after 40 minutes and allowed to cool, an opaque, white, tough solid was obtained. The relative viscosity of the polymer was 6.75 and the content of the components soluble in hot water was 6.76% by weight.

EXAMPLE 3

The same procedure as described in Example 1 was followed except that the amount of the promoter and the temperature of the initial lactam melt were changed as follows.

That is, 0.5 mole percent of sodium hydride (oily, 50%) was added to 2.66 moles of ε-caprolactam melted at 160° C. and dissolved therein. Thereafter, when 0.5 mole percent of triallylisocyanurate was added to the solution followed by mixing and the mixture was heated in an air bath of 170° C., the lactam became quite viscous after 15 minutes. When the product was heated for 60 minutes, withdrawn, and then allowed to cool, an opaque, white tough solid was obtained.

The relative viscosity of the product was 3.86 and the content of the components soluble in hot water was 2.0% by weight.

EXAMPLE 4

After melting 1.52 mole of ω-laurolactam by heating to 180° C., 0.2 mole percent of sodium hydride (oily, 50%) was dissolved in the melt and then 0.1 mole percent of triallylisocyanurate was added to the solution followed by mixing. When the mixture was heated in an air bath of 180° C., the molten lactam lost its fluidity after 15 minutes. Further, when the system was heated for 15 minutes and the product was withdrawn from the bath, an opaque, white and tough solid was obtained. The relative viscosity of the polymer thus prepared was 5.72.

EXAMPLE 5

A mixture of 0.41 mole of ω-laurolactam and 2.83 moles of ε-caprolactam was melted at 128° C. and then 0.2 mole percent of sodium hydride (oily, 50%) was dissolved in the melt. After adding further 0.1 mole percent of triallylisocyanurate to the solution followed by mixing, the mixture was heated in an air bath of 175° C. After 60 minutes, the lactam lost its fluidity and by allowing the product to cool, an opaque, tough solid having a very slight light yellow color was obtained.

The relative viscosity of the polymer thus prepared was 7.07.

While the invention has been described in detail and with reference to specific embodiments thereof, it will be apparent that various changes and modifications can be made therein without dparting from the spirit and scope thereof.

What is claimed is:

1. In a process for polymerizing at least one anhydrous or substantially anhydrous lactam having more than five ring members to a solid polymer by heating said lactam in the presence of an anionic polymerization catalyst, the improvement which comprises using triallylisocyanurate as a promoter, said anionic polymerization catalyst and said triallylisocyanurate being each present in an amount of from 0.05 to 10.0 mole percent to the amount of said lactam.

2. The method as claimed in claim 1, wherein said anionic polymerization catalyst is: (1) an alkali metal, (2) an alkaline earth metal, (3) a hydroxide of said alkali or alkaline earth metal, (4) a hydride of said alkali or alkaline earth metal, (5) a carbonate of said alkali or alkaline earth metal, (6) an organometallic compound of said alkali or alkaline earth metal, (7) a Grignard reagent, (8) an organoaluminum compound, (9) an organoboron compound, or (10) a reaction product of an ε-lactam having more than a five membered ring and one of (1) to (9) above.

3. The method as claimed in claim 1, wherein said anionic polymerization catalyst is present at a level of from about 0.1 to 3 mole percent to said lactam.

4. The method as claimed in claim 1, wherein said triallylisocyanurate is present at a level of from about 0.1 to 3 mole percent to the amount of said lactam.

5. The method as claimed in claim 1, wherein said lactam is pyrrolidone, piperidone, caprolactam, enatholactam, caprylolactam, pelargonolactam, laurolactam, decanolactam, undecanolactam, or mixtures thereof.

6. The method as claimed in claim 1, wherein said polymerization is conducted for a few seconds to a few hours.

References Cited

UNITED STATES PATENTS

| | | | |
|---|---|---|---|
| 3,022,274 | 2/1962 | Glickman et al | 260—78 P |
| 3,028,369 | 4/1962 | Butler et al. | 260—78 L |
| 3,138,574 | 6/1964 | Kohan | 260—78 L |
| 3,440,227 | 4/1969 | Baum | 260—78 L |

FOREIGN PATENTS

| | | | |
|---|---|---|---|
| 3,821,498 | 10/1963 | Japan | 260—78 L |

OTHER REFERENCES

Rose et al., The Condensed Chemical Dictionary, seventh edition, Reinhold Publ. Co., New York, N.Y. (1966), p. 959, QD5C5.

LUCILLE M. PHYNES, Primary Examiner

U.S. Cl. X.R.

260—78 P